United States Patent
Chen et al.

(10) Patent No.: US 11,294,183 B2
(45) Date of Patent: Apr. 5, 2022

(54) VR LENS STRUCTURE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yinwei Chen, Beijing (CN); Xuebing Zhang, Beijing (CN); Yali Liu, Beijing (CN); Zhiyu Sun, Beijing (CN); Hao Zhang, Beijing (CN); Haiwei Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 116 days.

(21) Appl. No.: 16/638,248

(22) PCT Filed: Apr. 10, 2019

(86) PCT No.: PCT/CN2019/082053
§ 371 (c)(1),
(2) Date: Feb. 11, 2020

(87) PCT Pub. No.: WO2019/196865
PCT Pub. Date: Oct. 17, 2019

(65) Prior Publication Data
US 2021/0011291 A1    Jan. 14, 2021

(30) Foreign Application Priority Data

Apr. 12, 2018 (CN) .......................... 201810326480.9

(51) Int. Cl.
*G02B 27/01* (2006.01)
*G02B 3/00* (2006.01)
(Continued)

(52) U.S. Cl.
CPC ....... *G02B 27/0172* (2013.01); *G02B 3/0037* (2013.01); *G02B 3/04* (2013.01);
(Continued)

(58) Field of Classification Search
CPC ................ G02B 27/0025; G02B 13/18; G02B 13/0045; G02B 27/646; G02B 9/64;
(Continued)

(56) References Cited

U.S. PATENT DOCUMENTS

2014/0347739 A1  11/2014  Okano
2018/0081092 A1   3/2018  Hudman
(Continued)

FOREIGN PATENT DOCUMENTS

CN    104181689 A    12/2014
CN    105242400 A     1/2016
(Continued)

OTHER PUBLICATIONS

Second Office Action dated Oct. 21, 2020 for application No. CN201810326480.9 with English translation attached.
(Continued)

*Primary Examiner* — Thomas K Pham
*Assistant Examiner* — Henry A Duong
(74) *Attorney, Agent, or Firm* — Nath, Goldberg & Meyer; Joshua B. Goldberg

(57) ABSTRACT

A VR lens structure and a display device are provided. The VR lens structure includes a first lens and a second lens disposed opposite to each other. The first lens is provided with a first side surface and a second side surface which are disposed opposite to each other, and at least one of the first
(Continued)

side surface and the second side surface is an aspheric surface. The second lens is a Fresnel lens, a smooth surface of the second lens is disposed proximal to the second side surface, and a Fresnel surface of the second lens is disposed farther away from the second side surface than the smooth surface.

18 Claims, 10 Drawing Sheets

(51) Int. Cl.
 *G02B 3/04* (2006.01)
 *G02B 3/08* (2006.01)
 *G06T 19/00* (2011.01)
(52) U.S. Cl.
 CPC .............. *G02B 3/08* (2013.01); *G06T 19/006* (2013.01); *G02B 2027/0123* (2013.01); *G02B 2027/0132* (2013.01)
(58) Field of Classification Search
 CPC .... G02B 15/20; G02B 15/173; G02B 21/361; G02B 25/001; G02B 9/62; G02B 15/14; G02B 15/17; G02B 9/60; G02B 13/24; G02B 15/16; G02B 15/177; G02B 15/22; G02B 27/0172; G02B 15/155; G02B 21/025; G02B 23/12; G02B 23/125; G02B 27/0037; G02B 27/0075; G02B 27/108; G02B 13/0035; G02B 13/02; G02B 13/04; G02B 21/04; G02B 9/34; G02B 13/004; G02B 13/006; G02B 13/06; G02B 6/26; G02B 6/29365; G02B 13/003; G02B 13/008; G02B 21/02; G02B 27/30; G02B 5/005; G02B 5/208; G02B 9/12; G02B 13/00; G02B 13/0065; G02B 13/14; G02B 15/02; G02B 15/24; G02B 15/28; G02B 1/002; G02B 1/11; G02B 2207/107; G02B 23/243; G02B 23/26; G02B 27/0927; G02B 27/141; G02B 27/4233; G02B 3/0037; G02B 3/0068; G02B 3/0081; G02B 3/08; G02B 5/1809; G02B 5/1876; G02B 6/122; G02B 9/06; G02B 9/10; G02B 13/0015; G02B 13/002; G02B 13/005; G02B 13/009; G02B 13/0095; G02B 13/16; G02B 13/26; G02B 15/10; G02B 15/163; G02B 15/167; G02B 17/0631; G02B 17/0642; G02B 17/0694; G02B 17/0844; G02B 17/0856; G02B 17/0892; G02B 19/0014; G02B 1/02; G02B 1/041; G02B 1/111; G02B 1/115; G02B 1/118; G02B 1/12; G02B 2006/12102; G02B 2006/12104; G02B 2006/12107; G02B 2027/0107; G02B 2027/0112; G02B 2027/0116; G02B 2027/0174; G02B 2027/0178; G02B 21/16; G02B 21/33; G02B 23/06; G02B 23/2469; G02B 25/04; G02B 26/06; G02B 26/0875; G02B 26/10; G02B 26/101; G02B 26/105; G02B 27/00; G02B 27/0012; G02B 27/0018; G02B 27/0043; G02B 27/005; G02B 27/0056; G02B 27/0087; G02B 27/0944; G02B 27/0955; G02B 27/0983; G02B 27/0988; G02B 27/10; G02B 27/1006; G02B 27/106; G02B 27/144; G02B 27/2228; G02B 27/283; G02B 27/286; G02B 27/4205; G02B 27/4211; G02B 27/4222; G02B 27/4266; G02B 3/04; G02B 3/10; G02B 3/14; G02B 5/0273; G02B 5/04; G02B 5/08; G02B 5/1814; G02B 5/1833; G02B 5/3016; G02B 5/3025; G02B 5/3083; G02B 5/3091; G02B 6/00; G02B 6/0026; G02B 6/005; G02B 6/0076; G02B 6/124; G02B 6/136; G02B 6/138; G02B 7/04; G02B 7/09; G02B 7/10; G02B 7/14; G02B 7/183; G02B 7/198; G02B 7/28; G02B 9/00; G02B 9/04; G02B 9/16; G02B 3/0037; G02B 2027/0123; G02B 2027/0132; G02B 27/0101; G02B 3/02; G06T 19/006
 USPC ........................................................ 359/420
 See application file for complete search history.

(56) References Cited

U.S. PATENT DOCUMENTS

| 2018/0088313 | A1* | 3/2018 | Jhang | G02B 3/08 |
| 2018/0136460 | A1* | 5/2018 | Bierhuizen | G02B 3/08 |
| 2018/0356614 | A1* | 12/2018 | Hsueh | G02B 13/0045 |
| 2019/0086642 | A1* | 3/2019 | Chen | G02B 13/02 |
| 2019/0258028 | A1* | 8/2019 | Huang | G02B 13/0045 |

FOREIGN PATENT DOCUMENTS

| CN | 106125307 A | 11/2016 |
| CN | 107703627 A | 2/2018 |
| CN | 206960773 U | 2/2018 |
| WO | 2018008249 A1 | 1/2018 |

OTHER PUBLICATIONS

First Office Action dated Feb. 26, 2020, for corresponding Chinese application 201810326480.9.
First Office Action dated Nov. 12, 2021 for Indian application No. 202047027761.
Extended European Search Report dated Dec. 9, 2021 for application No. 19785959.8.

* cited by examiner

VR LENS STRUCTURE AND DISPLAY DEVICE

CROSS-REFERENCE TO RELATED APPLICATIONS

This is a National Phase Application filed under 35 U.S.C. 371 as a national stage of PCT/CN2019/082053, filed on Apr. 10, 2019, an application claiming priority to Chinese Patent Application No. 201810326480.9, filed on Apr. 12, 2018, the entire contents of each of which are incorporated herein by reference.

TECHNICAL FIELD

The present disclosure relates to the field of display technology, and in particular relates to a VR lens structure and a display device.

BACKGROUND

As for VR display devices, in order to obtain a better visual experience, one design solution is to increase a visible field of view in order to increase a sense of immersion.

SUMMARY

Embodiments of the present disclosure provide a VR lens structure and a display device.

An aspect of the present disclosure provides a VR lens structure, including: a first lens and a second lens which are disposed opposite to each other; wherein, the first lens is provided with a first side surface and a second side surface which are disposed opposite to each other, and at least one of the first side surface and the second side surface is an aspheric surface; and the second lens is a Fresnel lens, a smooth surface of the second lens is disposed proximal to the second side surface, and a Fresnel surface of the second lens is disposed farther away from the second side surface than the smooth surface.

In an embodiment, the first side surface and the second side surface of the first lens are both aspheric surfaces;

a middle area of the first side surface protrudes away from the second side surface, and an edge area of the first side surface protrudes towards the second side surface; and the second side surface protrudes away from the first side surface.

In an embodiment, the first side surface and the second side surface of the first lens are both aspheric surfaces;

the first side surface protrudes away from the second side surface; and the second side surface protrudes away from the first side surface.

In an embodiment, the smooth surface of the second lens includes a plane or an aspheric surface.

In an embodiment, the smooth surface of the second lens is an aspheric surface and protrudes away from the Fresnel surface.

In an embodiment, a refractive index of the first lens is 1.55 to 1.70.

In an embodiment, a pitch between any two adjacent threads on the Fresnel surface of the second lens is 0.2 mm to 0.7 mm.

In an embodiment, thread depths on the Fresnel surface are different, and the deeper a depth of a thread is, the greater a draft angle of the thread is.

In an embodiment, a focal power of the first lens is $\Phi_1$, a focal power of the second lens is $\Phi_2$, and both of $\Phi_1$ and $\Phi_2$ satisfy the following formula:

$$0.8\Phi_1 \leq \Phi_2 \leq 2\Phi_1.$$

In an embodiment, an aperture of the first lens is smaller than an aperture of the second lens.

In an embodiment, a curvature radius of the middle area of the first side surface of the first lens is 99.935 mm±0.1 mm, and a curvature radius of the second side surface is −49.709 mm±0.1 mm; a thickness of the first lens is 8.160 mm±0.1mm; a refractive index of the first lens is 1.4918±0.01; and a curvature radius of the smooth surface of the second lens is 223.181 mm±0.1 mm, and a curvature radius of the Fresnel surface is −41.2 mm±0.1 mm; a thickness of the second lens is 4.769 mm; and a refractive index of the second lens is 1.4918±0.01.

It should be understood that the first value "±" second value in the present disclosure includes: any value between the value obtained by the first value "+" second value and the value obtained by the first value "−" second value (including one of the values at both endpoints).

In an embodiment, the curvature radius of the middle area of the first side surface of the first lens is 89.442 mm±0.1 mm, and the curvature radius of the second side surface is −59.286 mm±0.1 mm; the thickness of the first lens is 9.847 mm±0.1 mm; and a refractive index of the first lens is 1.4918±0.01; and the curvature radius of the smooth surface of the second lens is 0 mm±0.1 mm, and the curvature radius of the Fresnel surface is −63.253 mm±0.1 mm; the thickness of the second lens is 2.0 mm±0.1 mm; the refractive index of the second lens is 1.4918±0.01.

In an embodiment, the curvature radius of the first side surface of the first lens is 72.002 mm±0.1 mm, and the curvature radius of the second side surface is −283.789 mm±0.1 mm; the thickness of the first lens is 6.729 mm±0.1 mm; the refractive index of the first lens is 1.68879±0.01; and the curvature radius of the smooth surface of the second lens is 0 mm±0.1 mm, and the curvature radius of the Fresnel surface is −58.943 mm±0.1 mm; the thickness of the second lens is 2.0 mm±0.1 mm; the refractive index of the second lens is 1.4918±0.01.

Another aspect of the present disclosure provides a display device including:

a display panel; and a VR lens structure according to any one of the above embodiments of the present disclosure, located on a light exiting side of the display panel;

wherein the Fresnel surface of the second lens is disposed closer to the display panel than the smooth surface.

In an embodiment, a center point of the first lens, a center point of the second lens and a center point of the display panel are on a same straight line; and a distance between the center point of the display panel and a center point of the Fresnel surface of the second lens is smaller than an effective focal length of the VR lens structure.

In an embodiment, a curvature radius of the middle area of the first side of the first lens is 99.935 mm±0.1 mm, and a curvature radius of the second side surface is −49.709 mm±0.1 mm; a thickness of the first lens is 8.160 mm±0.1 mm; a refractive index of the first lens is 1.4918±0.01;

a curvature radius of the smooth surface of the second lens is 223.181 mm±0.1 mm, and a curvature radius of the Fresnel surface is −41.2 mm±0.1 mm; a thickness of the second lens is 4.769 mm±0.1 mm; a refractive index of the second lens is 1.4918±0.01; and the distance between the center point of the display panel and the center point of the Fresnel surface of the second lens is 32.945 mm±0.1 mm.

In an embodiment, the curvature radius of the middle area of the first side of the first lens is 89.442 mm±0.1 mm, and the curvature radius of the second side surface is −59.286 mm±0.1 mm; the thickness of the first lens is 9.847 mm±0.1 mm; the refractive index of the first lens is 1.4918±0.01;

the curvature radius of the smooth surface of the second lens is 0 mm±0.1 mm, and the curvature radius of the Fresnel surface is −63.253 mm±0.1 mm; the thickness of the second lens is 2.0 mm±0.1 mm; the refractive index of the second lens is 1.4918±0.01; and the distance between the center point of the display panel and the center point of the Fresnel surface of the second lens is 30.185 mm±0.1 mm.

In an embodiment, the curvature radius of the first side of the first lens is 72.002 mm±0.1 mm, and the curvature radius of the second side surface is −283.789 mm±0.1 mm; the thickness of the first lens is 6.729 mm±0.1 mm; the refractive index of the first lens is 1.68879±0.01;

the curvature radius of the smooth surface of the second lens is 0 mm±0.1 mm, and the curvature radius of the Fresnel surface is −58.943 mm±0.1 mm; the thickness of the second lens is 2.0 mm±0.1 mm; the refractive index of the second lens is 1.4918+0.01; and the distance between the center point of the display panel and the center point of the Fresnel surface of the second lens is 33.021 mm±0.1 mm.

DETAILED DESCRIPTION

Figure 1:
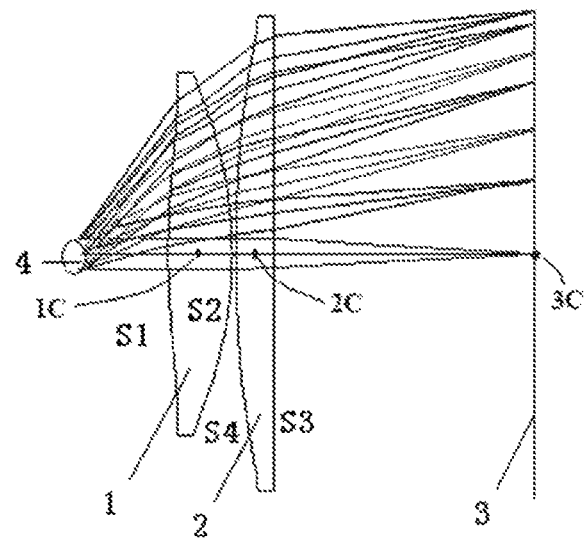
FIG. 1 is a schematic diagram of a VR lens structure and a display device according to an embodiment of the present disclosure.

For better understanding of the technical solutions of the present disclosure, the present disclosure will be further described below in detail with reference to the accompanying drawings and exemplary embodiments.

As described above, in visual reality (VR) display devices, in order to obtain a better visual experience, one design solution is to increase a visible field of view to increase a sense of immersion. However, the inventors of the present disclosure have found that conventional VR lens employing a single lens provides a small field of view due to the limitations of the eye distance. Even if human-computer interaction is neglected and the view angle is increased by forcibly reducing the eye distance, the problems of serious aberration and distortion of the single lens also exist, which leads to a poor experience. Therefore, a single lens VR light path structure is limited by the curvature and the thickness of the lens, and it is difficult to meet the requirement of the binocular integrated field of view exceeding 120 degrees.

In order to improve the view angle and the imaging quality of the VR lens and control the length of the optical path system of the VR lens, a VR lens structure using multiple lenses is proposed and put into practical use. By matching the parameters of the screen, finding a suitable VR lens structure having multiple lenses is one direction in which the display effect of the VR lens structure can be improved.

An embodiment of the present disclosure provides a VR lens structure, including: a first lens and a second lens which are disposed opposite to each other; the first lens is provided with a first side surface and a second side surface which are disposed opposite to each other, and at least one of the first side surface and the second side surface is an aspheric surface; the second lens is a Fresnel lens, and is provided with a Fresnel surface and a smooth surface which are disposed opposite to each other, the smooth surface of the second lens is disposed proximal to the second side surface of the first lens, and the Fresnel surface of the second lens is disposed farther away from the second side surface than the smooth surface. It should be understood that the Fresnel surface of the second lens is a surface provided with threads (or concentric circles), i.e. a surface that substantially changes the light propagation direction. The smooth surface and the Fresnel surface of the second lens are disposed opposite to each other.

Since the VR lens structure in this embodiment includes two lenses, i.e., the first lens and the second lens, when the VR lens structure is applied to a display device, the VR lens structure has four optically effective surfaces, i.e., the first side surface and the second side surface of the first lens, and the Fresnel surface and the smooth surface of the second lens; in this way, when designing the VR lens structure, the parameters of the four optically effective surfaces can be set. So that when applying to a display device, the formed VR lens structure has a large view angle and a good structure, which enhance the user experience.

For example, in this embodiment, a pitch between any two adjacent threads on the Fresnel surface of the second lens is 0.2 mm to 0.7 mm, thread depths are different, and the deeper a thread depth is, the larger the draft angle (i.e., demould angle) of the thread is. That is, the draft angles of respective threads are different and are gradually distributed, so that the demoulding difficulty can be reduced.

Further, in the present embodiment, a focal power of the first lens of the VR lens structure is $\Phi 1$, a focal power of the second lens is $\Phi 2$, and both of $\Phi 1$ and $\Phi 2$ satisfy the following formula: $0.8\Phi 1 \leq \Phi 2 \leq 2\Phi 1$; this kind of arrangement can make the monocular field of view (FOV) of the virtual display device be greater than 115 degrees for the person who uses this VR lens structure, and make the binocular FOV for the person reach 130, thereby realizing a larger field of view scope and increase the sense of immersion. Besides, compared with a single lens device, the virtual reality device can provide a larger view field angle, and meanwhile, the size of the whole equipment can be reduced, particularly the size of a screen is smaller, and a compact VR display device structure is obtained.

The VR lens structure in this embodiment and the structure and effects of a display device including the VR lens structure will be further described with reference to the following embodiments.

Embodiments of the present disclosure provide a VR lens structure and a display device including the same. For example, the VR lens structure includes a first lens 1 and a second lens 2 which are disposed opposite to each other, as shown in FIG. 1. The first lens 1 is an aspheric lens, i.e., a first side surface S1 and a second side surface S2 of the first lens 1 are both aspheric surface. The first side surface S1 can be named as a first aspheric surface, and the second side surface S2 can be named as a second aspheric surface. A middle area of the first aspheric surface protrudes away from the second aspheric surface, and an edge area protrudes towards the second aspheric surface. The second aspheric surface protrudes away from the first aspheric surface. The second lens 2 is a Fresnel lens, and a smooth surface S4 of the second lens 2 is aspheric surface and protrudes away from the Fresnel surface S3.

Because the VR lens structure in this embodiment includes two lenses, i.e., the first lens 1 having two aspheric surfaces and the second lens 2 being the Fresnel lens, and the smooth surface of the Fresnel lens is also an aspheric surface. That is, in this embodiment, the first lens 1 and the second lens 2 are both aspheric lenses, which is beneficial to controlling a light refraction direction to realize a large view angle and enhance user experience.

As an example, the VR lens structure described above is applied to a display device, a position of a pupil 4 of a viewer, a first lens 1, a second lens 2, and a screen of a display panel 3, are respectively disposed from the left side to the right side in FIG. 1. Here, a focal point of the pupil 4, a center point (e.g., geometric center point) 1C of the first lens 1, a center point (e.g., geometric center point) 2C of the second lens 2, and a center point (e.g., geometric center point) 3C of the display panel 3 should be on the same straight line. An aperture (e.g. diameter) of the second lens 2 is larger than an aperture of the first lens 1, which provides a significant refraction angle of an incident light and a size of the display panel 3 can be matched according to the refraction angle. For example, the first lens and the second lens may be made of optical resin or glass, and in order to reduce the weight of the structure, a resin may be used. In this embodiment, a distance between the center point of the display panel 3 and the center point of the Fresnel surface S3 of the second lens 2 is an object distance, which is smaller than an effective focal length EFL of a combined lens formed by the first lens 1 and the second lens 2. In one example, each of the first lens 1 and the second lens 2 may have a circular shape. However, the present disclosure is not limited thereto, and for example, the shape of each of the first and second lenses 1 and 2 may be the same as the shape of the display panel 3.

The parameters of a curvature radius of each optically effective surface of the first lens 1 and the second lens 2, a lens center thickness, a distance between the first lens 1 and the second lens 2, a distance between the first lens 1 and the pupil 4 of the viewer, and a distance between the second lens 2 and the display panel 3, and the like are given below.

The effective focal length EFL of the combined lens formed by the first lens and the second lens is 36.1 mm; the distance between the first lens 1 and the pupil 4 of the viewer is 11 mm, and the curvature radius (e.g., the middle area) of the first side surface S1 of the first lens 1 is 99.935 mm, the curvature radius of the second side surface S2 is −49.709 mm; the thickness of the first lens 1 is 8.160 mm; the refractive index of the first lens 1 is 1.4918; an Abbe coefficient (also referred to as Abbe number) of the first lens 1 is 57.44; a curvature radius of the smooth surface S4 of the second lens 2 is 223.181 mm, a curvature radius of (e.g., the contour of) the Fresnel surface S3 is −41.2 mm; a thickness of the second lens 2 is 4.769 mm; the refractive index of the second lens 2 is 1.4918; an Abbe number of the second lens 2 is 57.44; the distance between the first lens 1 and the second lens 2 is 0.5 mm; the distance between the center point of the display panel 3 and the center point of the Fresnel surface S3 of the second lens 2 is 32.945 mm.

Figure 2A:
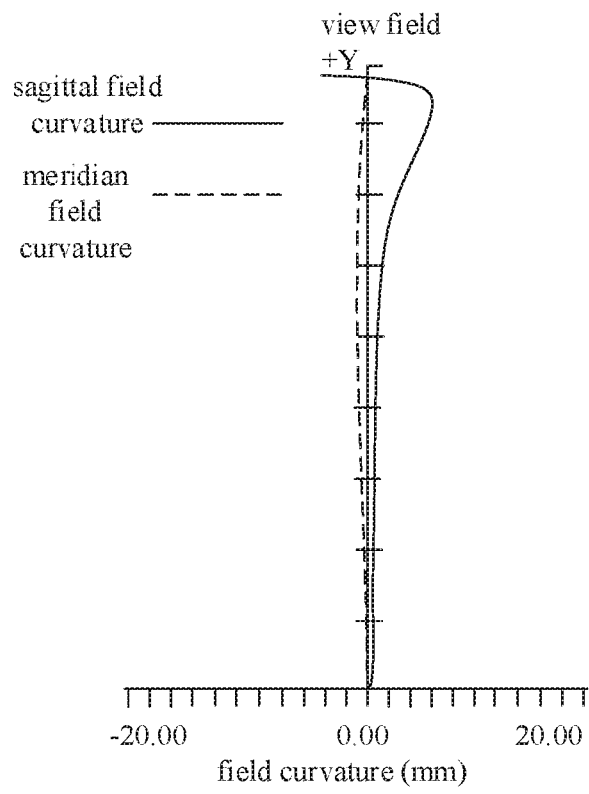
FIGS. 2A and 2B are field curvature diagrams of the VR lens structure of the embodiment shown in FIG. 1 of the present disclosure.
Figure 2B:
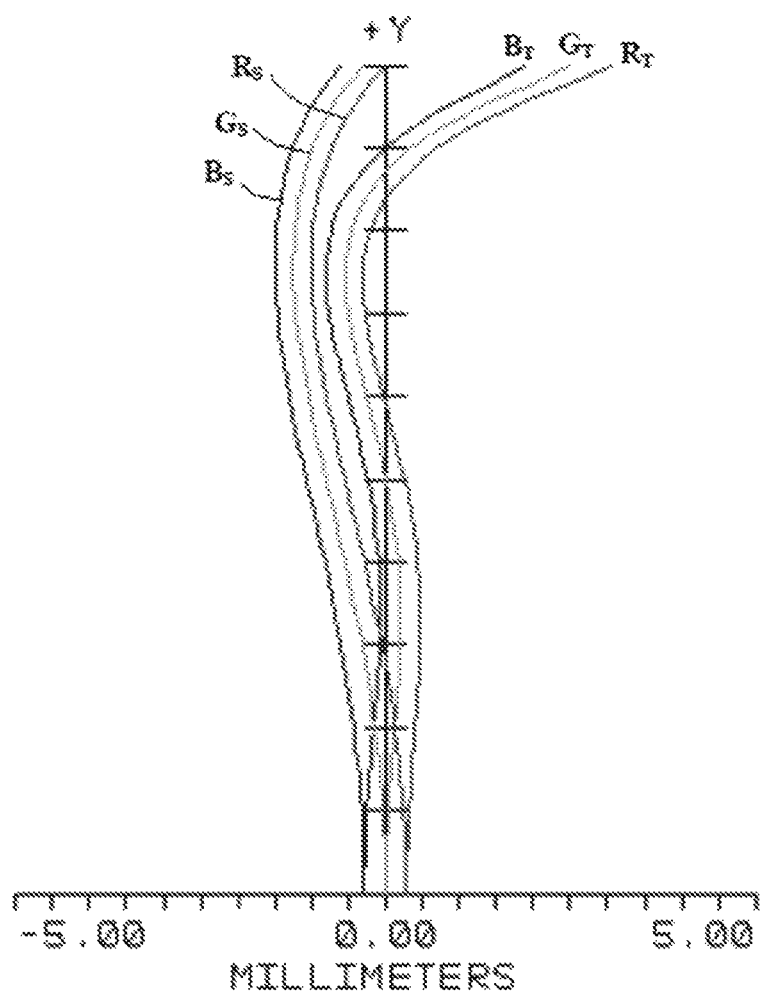
Figure 2C:
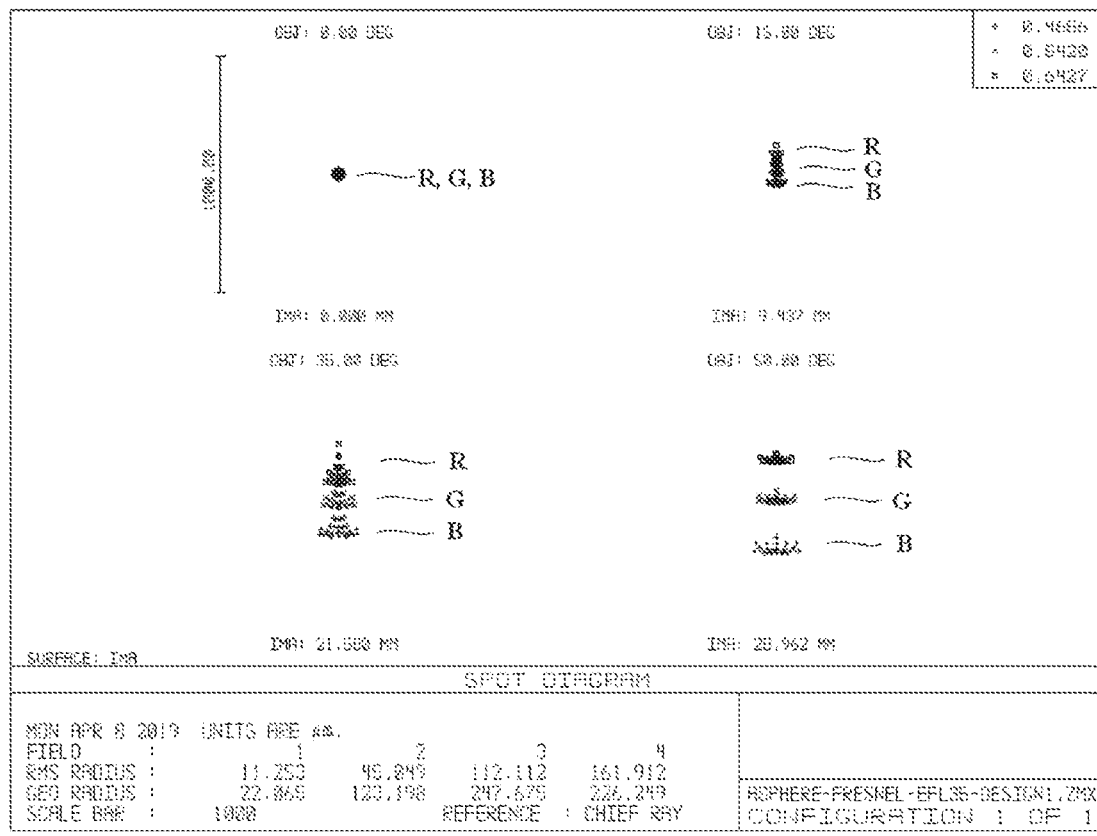
FIG. 2C is a spot diagram of diffuse spots at the focal length of the VR lens structure of the embodiment shown in FIG. 1 of the present disclosure.
Figure 3:
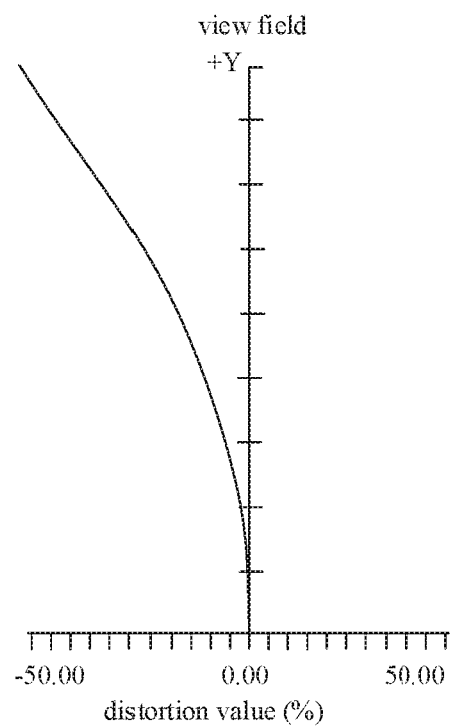
FIG. 3 is a schematic diagram of a distortion curve of the VR lens structure of the embodiment shown in FIG. 1 of the present disclosure.

To verify the performance of the VR lens structure designed according to the above parameters, the inventors of the present disclosure simulated its performance by using the optical design software Zemax provided by Zemax corporation, USA. Simulation results show that a field curvature (also referred to as "curvature of field"), a diffuse spot, and a distortion performance of the VR lens structure are shown in FIGS. 2A, 2B, 2C, and 3, respectively. It should be understood that, in FIGS. 2A, 2B, 5A, 5B, 8A, and 8B, an origin of coordinates represents a position of the pupil 4 in FIGS. 1, 4, and 7, respectively, the negative direction of the abscissa represents the left side of the pupil 4, and the positive direction of the abscissa represents the right side of the pupil 4 as shown; further, the vertical axis (i.e., Y-axis) represents the dimension normalized in the vertical direction shown in FIGS. 1, 4, and 7, so that there is no dimension unit. In the range of the abscissa shown in FIG. 2A, a field curvature curves of red light (R), green light (G), and blue light (B) substantially overlap each other. FIG. 2B shows the field curvature curves of red (R), green (G) and blue (B) light in a smaller range of the abscissa. In the abscissa range shown in FIG. 2B, the field curvature curves of red light (R), green light (G), and blue light (B) are slightly shifted from each other. In FIG. 2B (and FIGS. 5B and 8B), subscripts "S" and "T" respectively indicate two mutually perpendicular directions set in Zemax software, i.e., field curvature curves $R_S$, $G_S$, and $B_S$ in FIGS. 2B, 5B, and 8B may respectively correspond to "meridian field curvature" in FIGS. 2A, 5A, and 8A, and field curvature curves $R_T$, $G_T$, and $B_T$ in FIGS. 2B, 5B, and 8B may respectively correspond to "sagittal field curvature" in FIGS. 2A, 5A, and 8A. FIG. 2C is a spot diagram of diffuse spots at its focal length of the VR lens structure of the embodiment shown in FIG. 1 of the present disclosure. The three values in the upper right corner of FIG. 2C, from bottom to top, may represent the wavelengths (in microns) of red (R), green (G), and blue (B) light, respectively, used in the simulation. As can be seen from the drawings, the field curvature value of the VR lens structure in this embodiment is not obviously increased at a large view angle, which ensures a better imaging quality. Meanwhile, the distortion value of the lens group is gradually increased along with the change of the view angle, and the distortion value has a smooth increasing curve, which is beneficial to performing an anti-distortion correction by software later, and the problem that a poor watching experience caused by a deformation of a display scene is avoided. The VR lens structure in the embodiment can realize a view field range of 120 degrees for a single eye, and the total view field of both eyes may exceed 135 degrees, so that the visual sense of immersion of the VR display device is greatly enhanced. In the present embodiment, the focal power Φ1 of the first lens 1 (e.g., an aspheric lens)=146.11 1/m (the unit 1/m may also be expressed as $m^{-1}$), and the focal power Φ2 of the second lens 2 (e.g., a Fresnel lens)=146.13 1/m, i.e., a Fresnel focal power is set to be greater than 0.8 times an aspheric surface focal power and less than 2 times the aspheric surface focal power. Through the above setting, the whole thickness of the VR lens structure is small, and the imaging quality is good.

For example, in the present embodiment, the curvature radius of each optically effective surface of the first lens 1 and the second lens 2, the lens center thickness, the distance between the first lens 1 and the second lens 2, the distance between the first lens 1 and the pupil 4 of the viewer, and the distance between the second lens 2 and the display panel 3 are not limited to the above values, and any value within a range of ±0.1 mm based on the above values may be selected, and any refractive index value within a range of ±0.01 based on the above values may be selected as the refractive index of the material of each of the first lens 1 and the second lens 2.

Figure 4:
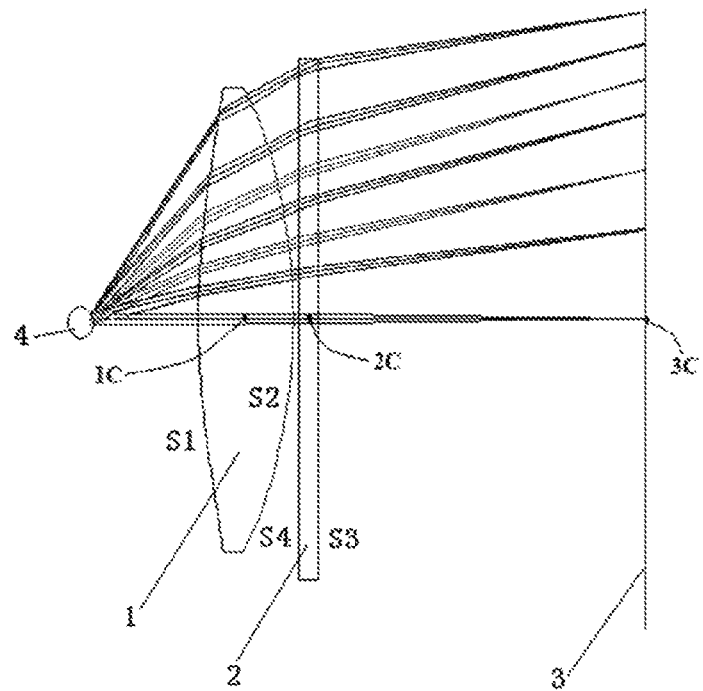
FIG. 4 is a schematic diagram of another VR lens structure and another display device according to an embodiment of the present disclosure.

Embodiments of the present disclosure provide another VR lens structure and another display device including the same. For example, the VR lens includes a first lens 1 and a second lens 2 which are disposed opposite to each other, as shown in FIG. 4. The first lens 1 is an aspheric lens, i.e., a first side surface S1 and a second side surface S2 of the first lens 1 are both aspheric surface; the first side surface S1 can be named as a first aspheric surface, and the second side surface S2 can be named as a second aspheric surface. A middle area of the first aspheric surface protrudes away from the second aspheric surface, and an edge area thereof protrudes towards the second aspheric surface; the second aspheric surface protrudes away from the first aspheric surface. The second lens 2 is a Fresnel lens, and a smooth surface S4 of the second lens 2 is a plane.

Because the VR lens structure in this embodiment includes two lenses, i.e., the first lens 1 having two aspheric surfaces and the second lens 2 being the Fresnel lens, so when the VR lens structure is applied to a display device, the VR lens structure having four optically effective surfaces, i.e., the first side surface S1 and the second side surface S2 of the first lens 1, and the Fresnel surface S3 and the smooth surface S4 of the second lens; in this way, when designing the VR lens structure, the parameters of the four optically effective surfaces can be set, so that the formed VR lens structure has a large view angle and a good structure when applied to a display device, thereby enhancing the user experience. In addition, different from the VR lens structure shown in FIG. 1, the smooth surface S4 of the second lens in this embodiment is a plane, which is convenient to manufacture and the second lens has a simple structure.

As an example, the VR lens structure described above is applied to a display device, a position of a pupil 4 of a viewer, a first lens 1, a second lens 2, and a screen of a display panel 3, are respectively disposed from the left side to the right side in FIG. 4. Here, a focal point of the pupil 4, a center point (e.g., geometric center point) 1C of the first lens 1, a center point (e.g., geometric center point) 2C of the second lens 2, and a center point (e.g., geometric center point) 3C of the display panel 3 should be on the same straight line. An aperture of the second lens 2 is larger than that of the first lens 1, which provides a significant refraction angle of an incident light and a size of the display panel 3 can be matched according to the refraction angle. The first lens and the second lens may be made of optical resin or glass, and a resin may be used for reducing the structural weight. A distance from the center point of the display panel 3 to the center point of the Fresnel surface S3 of the second lens 2 in this embodiment is an object distance, which is smaller than an effective focal length EFL of the combined lens formed by the first lens 1 and the second lens 2.

The parameters of a curvature radius of each optically effective surface of the first lens 1 and the second lens 2, a lens center thickness, a distance between the first lens 1 and the second lens 2, a distance between the first lens 1 and the pupil 4 of the viewer, and a distance between the second lens 2 and the display panel 3, and the like are given below.

The effective focal length EFL of the combined lens formed by the first lens and the second lens is 36.0 mm; the distance between the first lens 1 and the pupil 4 of the viewer is 11 mm, and the curvature radius (e.g., the middle area) of the first side surface S1 of the first lens 1 is 89.442 mm, the curvature radius of the second side surface S2 is −59.286 mm; the thickness of the first lens 1 is 9.847 mm; the refractive index of the first lens 1 is 1.4918; the Abbe number of the first lens 1 is 57.44; the curvature radius of the smooth surface S4 of the second lens 2 is 0 mm, the curvature radius of the Fresnel surface S3 is −63.253 mm; a thickness of the second lens 2 is 2.0 mm; the refractive index of the second lens 2 is 1.4918; the Abbe number of the second lens 2 is 57.44; the distance between the first lens 1 and the second lens 2 is 0.5 mm; the distance between the center point of the display panel 3 and the center point of the Fresnel surface S3 of the second lens 2 is 30.185 mm.

Figure 5A:
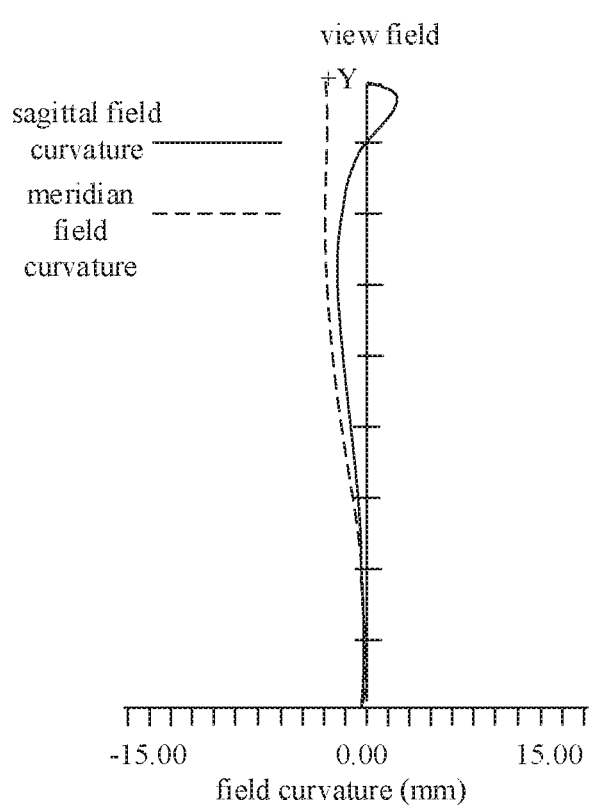
FIGS. 5A and 5B are field curvature diagrams of the VR lens structure of the embodiment shown in FIG. 4 of the present disclosure.
Figure 5B:
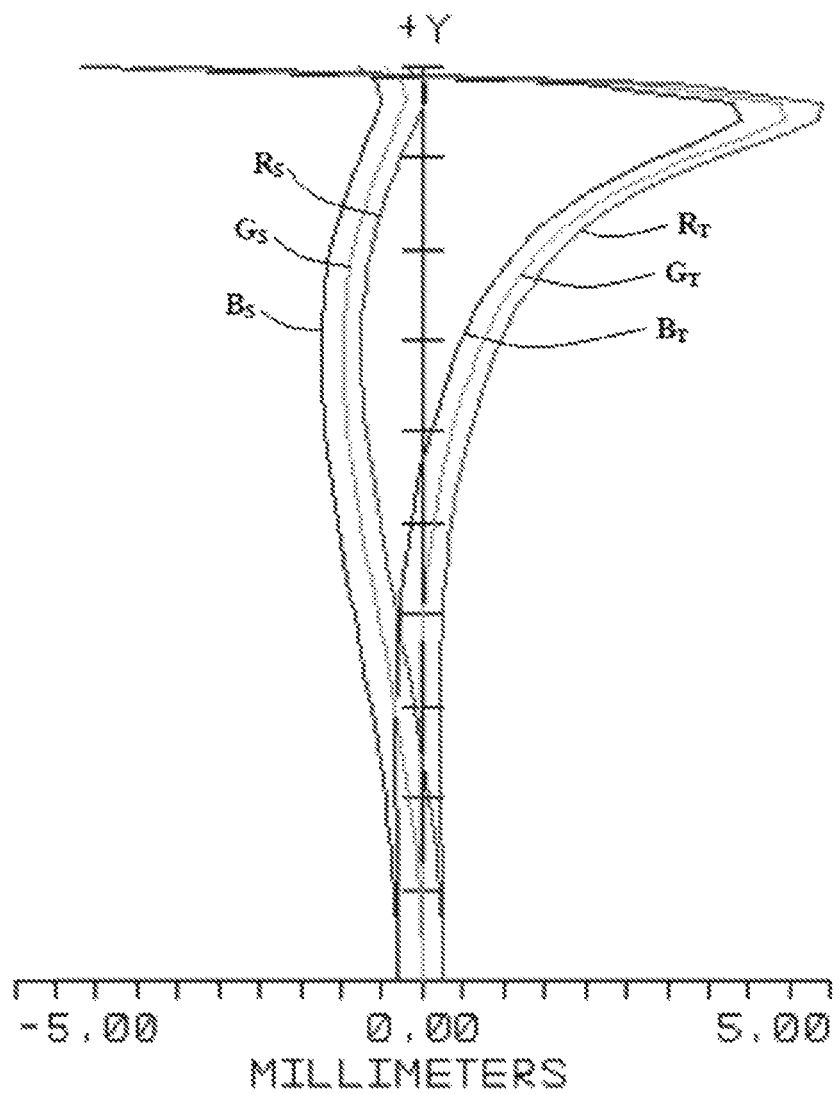
Figure 6:
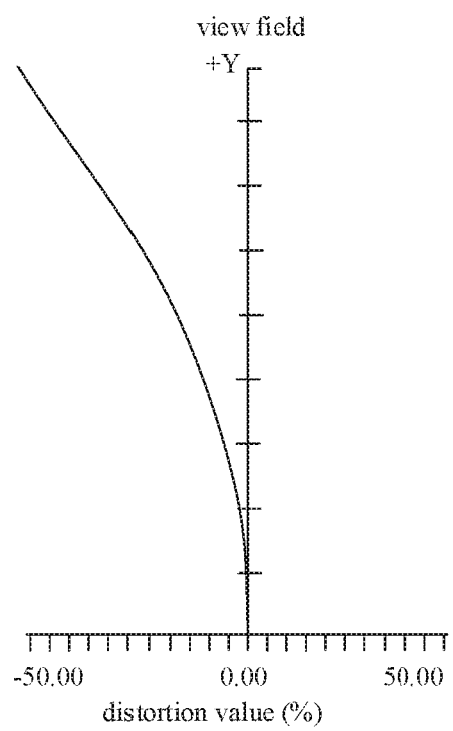
FIG. 6 is a schematic diagram of a distortion curve of the VR lens structure of the embodiment shown in FIG. 4 of the present disclosure.

The VR lens structure set according to the above parameters has the simulation results of the field curvature and distortion performance of the VR lens structure as shown in FIGS. 5A, 5B and 6, respectively (the spot diagram of diffuse spots of the present embodiment is similar with FIG. 2C, and thus is not separately shown). As can be seen from the drawings, the field curvature value of the VR lens structure in this embodiment is not obviously increased at a large view angle, which ensures better imaging quality. Meanwhile, the distortion value of the lens group is gradually increased along with the change of the view angle, and the distortion value has a smooth increasing curve, which is beneficial to performing an anti-distortion correction by software later, and the problem that a poor watching experience caused by a deformation of a display scene is avoided. The VR lens structure shown in the embodiment can realize a view field range of 115 degrees for a single eye, and a total view field of both eyes may exceed 130 degrees, so that the visual sense of immersion of the VR display device is greatly enhanced.

For example, in the present embodiment, the curvature radius of each optically effective surface of the first lens 1 and the second lens 2, the lens center thickness, the distance between the first lens 1 and the second lens 2, the distance between the first lens 1 and the pupil 4 of the viewer, and the distance between the second lens 2 and the display panel 3 are not limited to the above values, and any value within a range of ±0.1 mm based on the above values may be selected, and any refractive index value within a range of ±0.01 based on the above values may be selected as the refractive index of the material of each of the first lens 1 and the second lens 2.

Figure 7:
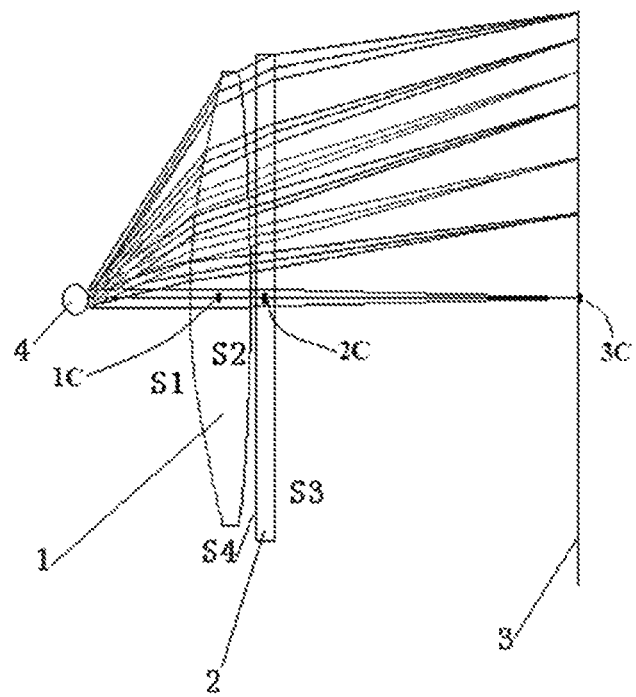
FIG. 7 is a schematic diagram of another VR lens structure and another display device according to an embodiment of the present disclosure.

Embodiments of the present disclosure provide another VR lens structure and another display device applying the same. Wherein, the VR lens includes a first lens 1 and a second lens 2 which are disposed opposite to each other, as shown in FIG. 7. The first lens 1 is an aspheric lens, i.e., the first side surface S1 and the second side surface S2 of the first lens 1 are both aspheric surface; the first side surface S1 can be named as a first aspheric surface, and the second side surface S2 can be named as a second aspheric surface. The first aspheric surface protrudes away from the second aspheric surface; the second aspheric surface protrudes away from the first aspheric surface. The second lens 2 is a Fresnel lens, and the smooth surface S4 of the second lens 2 is a plane.

Because the VR lens structure in this embodiment includes two lenses, i.e., the first lens 1 having two aspheric surfaces and the second lens 2 being the Fresnel lens, so when the VR lens structure is applied to a display device, the VR lens structure having four optically effective surfaces, i.e., the first side surface S1 and the second side surface S2 of the first lens 1, and the Fresnel surface S3 and the smooth surface S4 of the second lens 2; in this way, when designing the VR lens structure, the parameters of the four optically effective surfaces can be set, so that the formed VR lens structure has a larger view angle and a better structure when applied to a display device, thereby enhancing the user experience.

As an example, the VR lens structure described above is applied to a display device, a position of a pupil 4 of a viewer, a first lens 1, a second lens 2, and a screen of a display panel 3, are respectively disposed from the left side to the right side in FIG. 7. Here, the focal point of the pupil 4, the center point (e.g., geometric center point) 1C of the first lens 1, the center point (e.g., geometric center point) 2C of the second lens 2, and the center point (e.g., geometric center point) 3C of the display panel 3 should be on the same straight line. The aperture of the second lens 2 is larger than that of the first lens 1, which provides a significant refraction angle of an incident light and a size of the display panel 3 can be matched according to the refraction angle. The first lens and the second lens may be made of optical resin or glass, and a resin may be used for reducing the structural weight. Meanwhile, the material used for the first lens has a high refractive index, which is between 1.55 and 1.70. The distance (i.e., the object distance) from the center point of the display panel 3 to the center point of the Fresnel surface S3 of the second lens 2 in this embodiment is smaller than the effective focal length EFL of the combined lens formed by the first lens 1 and the second lens 2.

The parameters of the curvature radius of each optically effective surface of the first lens 1 and the second lens 2, the lens center thickness, the distance between the first lens 1 and the second lens 2, the distance between the first lens 1 and the pupil 4 of the viewer, and the distance between the second lens 2 and the display panel 3, and the like are given below.

The effective focal length EFL of the combined lens formed by the first lens and the second lens is 35.37 mm; the distance between the first lens and the pupil 4 of the viewer is 11 mm, and the curvature radius of the first side surface S1 of the first lens 1 is 72.002 mm, the curvature radius of the second side surface S2 is −283.789 mm; the thickness of the first lens 1 is 6.729 mm; the refractive index of the first lens 1 is 1.68879; the Abbe number of the first lens 1 is 52.868; the curvature radius of the smooth surface S4 of the second lens 2 is 0 mm, the curvature radius of the Fresnel surface S3 is −58.943 mm; the thickness of the second lens 2 is 2.0 mm; the refractive index of the second lens 2 is 1.4918; the Abbe number of the second lens 2 is 57.44; the distance between the first lens 1 and the second lens 2 is 0.5 mm; the distance between the center point of the display panel 3 and the center point of the Fresnel surface S3 of the second lens 2 is 33.021 mm.

Figure 8A:
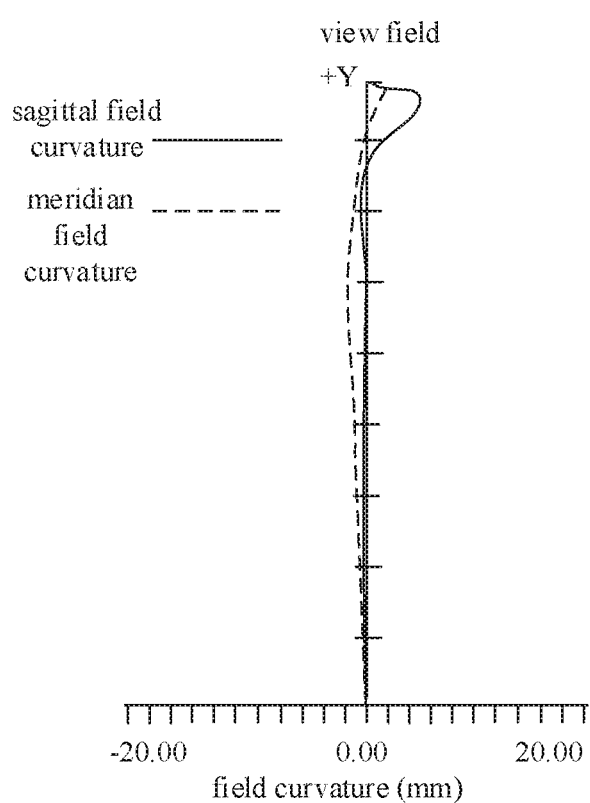
FIGS. 8A and 8B are field curvature diagrams of the VR lens structure of the embodiment shown in FIG. 7 of the present disclosure.
Figure 8B:
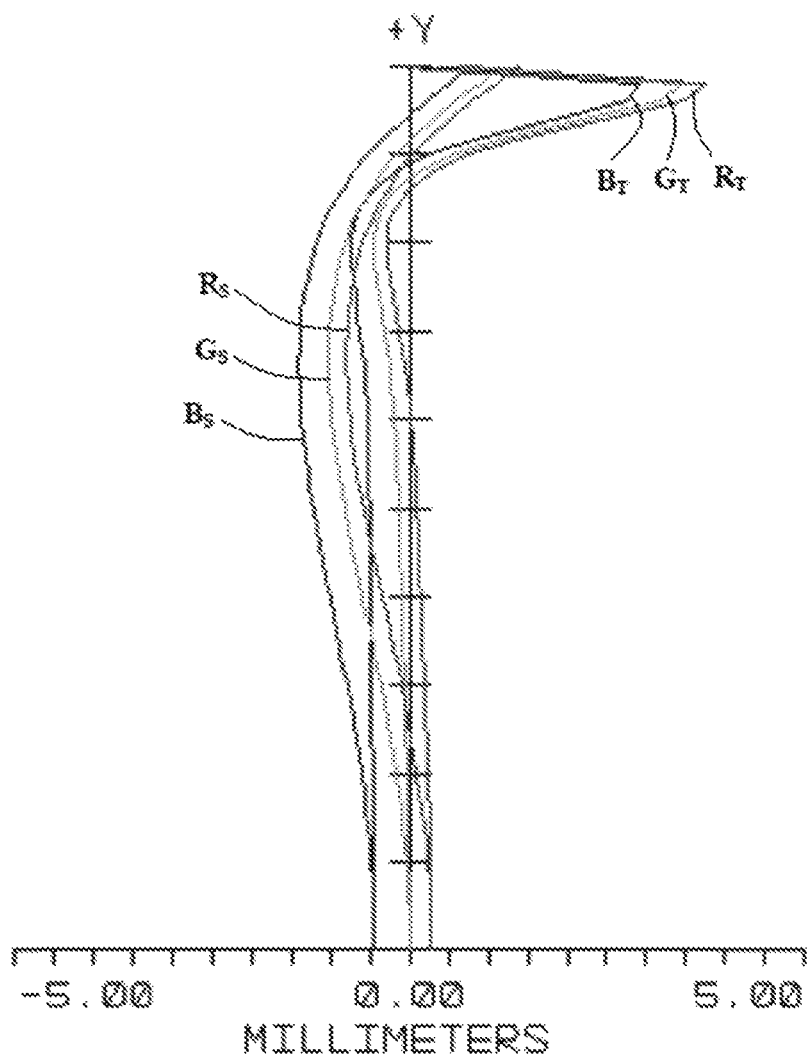
Figure 9:
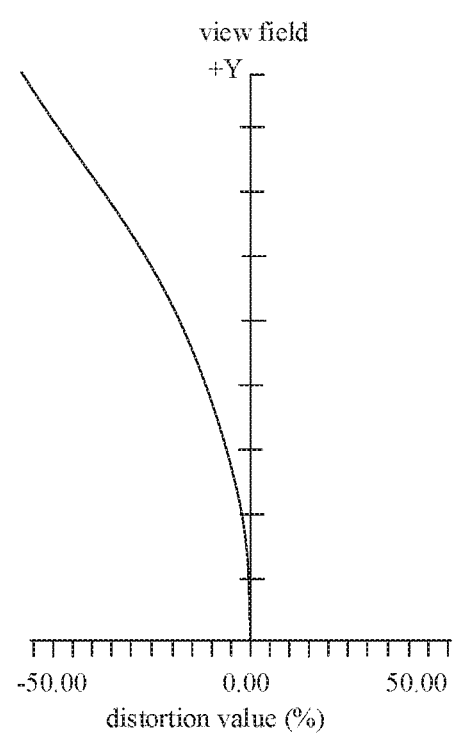
FIG. 9 is a schematic diagram of a distortion curve of the VR lens structure of the embodiment shown in FIG. 7 of the present disclosure.

The results of the simulation of the field curvature and distortion performance of the VR lens structure set according to the above parameters are shown in FIGS. 8A, 8B, and 9, respectively (the spot diagram of diffuse spots of the present embodiment is similar with FIG. 2C, and thus is not separately shown). In this embodiment, the first lens is made of a high refractive index material, which may have a refractive index n of 1.68879 as an example, so that the first lens may have a thinner thickness. Under the condition of guaranteeing the performance of the lens group, the thickness and the weight of the VR lens structure are reduced, and the VR lens structure has an advantage in application. The field curvature value of the VR lens structure in the embodiment is not significantly increased at a large view angle, so that better imaging quality is ensured. Meanwhile, the distortion value of the lens group is gradually increased along with the change of the field angle, and the distortion value has a smooth increasing curve, so that the lens group is beneficial to performing an anti-distortion correction by software later, and the problem that a poor watching experience caused by the deformation of a display scene is avoided. The VR lens structure in the embodiment can realize a view field range of 118 degrees for a single eye, and a total view field of both eyes may exceed 130 degrees, so that the visual sense of immersion of the VR display device is greatly enhanced.

For example, in the present embodiment, the curvature radius of each optically effective surface of the first lens 1 and the second lens 2, the lens center thickness, the distance between the first lens 1 and the second lens 2, the distance between the first lens 1 and the pupil 4 of the viewer, and the distance between the second lens 2 and the display panel 3 are not limited to the above values, and any value within a range of ±0.1 mm based on the above values may be selected, and any refractive index value within a range of ±0.01 based on the above values may be selected as the refractive index of the material of each of the first lens 1 and the second lens 2.

The VR lens structure according to any one of the above described embodiments of the present disclosure has at least the following advantageous technical effects. Since the VR lens structure in the present disclosure includes two lenses, i.e., the first lens and the second lens, so the VR lens structure may be applied to a display device, and the VR lens structure has four optically effective surfaces, i.e., the first side surface and the second side surface of the first lens, and the Fresnel surface and the smooth surface of the second lens; in this way, when designing the VR lens structure, the parameters of the four optically effective surfaces can be set, so that the formed VR lens structure has a larger view angle and a better structure when applied to a display device, thereby enhancing the user experience.

Embodiments of the present disclosure provide a display device. The display device includes a display panel 3 and a VR lens structure as shown in FIG. 1, 4 or 7 located on the light exiting side of the display panel 3. The Fresnel surface S3 of the second lens 2 is disposed closer to the display panel 3 than the smooth surface S4.

By including the VR lens structure according to the embodiment shown in FIG. 1, 4, or 7 of the present disclosure, the display device has a larger view angle and a smaller size, which improves the sense of immersion.

It should be understood that, due to the reversibility of optical path, although the reference numeral "4" refers to a pupil in the VR lens structure and the display device shown in FIG. 1, 4, or 7, in a product of the VR lens structure and the display device, the position of the reference numeral "4" may be provided with a light source, and the pupil of a viewer may be located at the right side of the display panel 3. Accordingly, as described above, a distance between the light source and the first lens may be 11 mm.

Further aspects of the display device and details thereof may be found in the description above with reference to FIGS. 1-9.

It is to be understood that the above embodiments are merely exemplary embodiments for explaining the principles of the present disclosure, and that the present disclosure is not limited thereto. It will be apparent to a person skilled in the art that various changes and modifications can be made therein without departing from the spirit and scope of the present disclosure, and these changes and modifications also fall within the scope of the present disclosure.

What is claimed is:

1. A VR lens structure, comprising a first lens and a second lens which are disposed opposite to each other; wherein,
   the first lens is provided with a first side surface and a second side surface which are disposed opposite to each other, and at least one of the first side surface and the second side surface is an aspheric surface;
   the second lens is a Fresnel lens, a smooth surface of the second lens is disposed proximal to the second side surface, and a Fresnel surface of the second lens is disposed farther away from the second side surface than the smooth surface;
   a curvature radius of a middle area of the first side surface of the first lens is 99.935 mm±0.1 mm, and a curvature radius of the second side surface is −49.709 mm±0.1 mm; a thickness of the first lens is 8.160 mm±0.1 mm; a refractive index of the first lens is 1.4918±0.01; and
   a curvature radius of the smooth surface of the second lens is 223.181 mm±0.1 mm, and a curvature radius of the Fresnel surface is −41.2 mm±0.1 mm; a thickness of the second lens is 4.769 mm; and a refractive index of the second lens is 1.4918±0.01.

2. The VR lens structure according to claim 1, wherein the first side surface and the second side surface of the first lens are both aspheric surfaces;
   a middle area of the first side surface protrudes away from the second side surface, and an edge area of the first side surface protrudes towards the second side surface; and
   the second side surface protrudes away from the first side surface.

3. The VR lens structure according to claim 1, wherein the first side surface and the second side surface of the first lens are both aspheric surfaces;
   the first side surface protrudes away from the second side surface; and
   the second side surface protrudes away from the first side surface.

4. The VR lens structure according to claim 1, wherein the smooth surface of the second lens comprises an aspheric surface.

5. The VR lens structure according to claim 4, wherein the smooth surface of the second lens is an aspheric surface and protrudes away from the Fresnel surface.

6. The VR lens structure according to claim 1, wherein a pitch between any two adjacent threads on the Fresnel surface of the second lens is 0.2 mm to 0.7 mm.

7. The VR lens structure according to claim 1, wherein thread depths on the Fresnel surface are different, and the deeper a depth of a thread is, the greater a draft angle of the thread is.

8. The VR lens structure according to claim 1, wherein a focal power of the first lens is $\Phi 1$, a focal power of the second lens is $\Phi 2$, and both of $\Phi 1$ and $\Phi 2$ satisfy the following formula:

$$0.8\Phi 1 \leq \Phi 2 \leq 2\Phi 1.$$

9. The VR lens structure according to claim 1, wherein an aperture of the first lens is smaller than an aperture of the second lens.

10. A display device, comprising:
    a display panel; and
    a VR lens structure according to claim 1 located on a light exiting side of the display panel;
    wherein the Fresnel surface of the second lens is disposed closer to the display panel than the smooth surface.

11. The display device according to claim 10, wherein a center point of the first lens, a center point of the second lens and a center point of the display panel are on a same straight line, and a distance between the center point of the display panel and a center point of the Fresnel surface of the second lens is smaller than an effective focal length of the VR lens structure.

12. The display device according to claim 10, wherein
    the distance between the center point of the display panel and the center point of the Fresnel surface of the second lens is 32.945 mm±0.1 mm.

13. A VR lens structure, comprising a first lens and a second lens which are disposed opposite to each other; wherein,
    the first lens is provided with a first side surface and a second side surface which are disposed opposite to each other, and at least one of the first side surface and the second side surface is an aspheric surface;
    the second lens is a Fresnel lens, a smooth surface of the second lens is disposed proximal to the second side surface, and a Fresnel surface of the second lens is disposed farther away from the second side surface than the smooth surface;
    a curvature radius of a middle area of the first side surface of the first lens is 89.442 mm±0.1 mm, and a curvature radius of the second side surface is −59.286 mm±0.1 mm; a thickness of the first lens is 9.847 mm±0.1 mm; and a refractive index of the first lens is 1.4918±0.01; and
    a curvature radius of the smooth surface of the second lens is 0 mm±0.1 mm, a curvature radius of the Fresnel surface is −63.253 mm±0.1 mm; a thickness of the second lens is 2.0 mm±0.1 mm; and a refractive index of the second lens is 1.4918±0.01.

14. A display device, comprising:
    a display panel; and
    a VR lens structure according to claim 13 located on a light exiting side of the display panel;
    wherein the Fresnel surface of the second lens is disposed closer to the display panel than the smooth surface.

15. The display device according to claim 14, wherein
    the distance between the center point of the display panel and the center point of the Fresnel surface of the second lens is 30.185 mm±0.1 mm.

16. A VR lens structure, comprising a first lens and a second lens which are disposed opposite to each other; wherein, the first lens is provided with a first side surface and a second side surface which are disposed opposite to each other, and at least one of the first side surface and the second side surface is an aspheric surface;

the second lens is a Fresnel lens, a smooth surface of the second lens is disposed proximal to the second side surface, and a Fresnel surface of the second lens is disposed farther away from the second side surface than the smooth surface;

a curvature radius of the first side surface of the first lens is 72.002 mm±0.1 mm, and a curvature radius of the second side surface is −283.789 mm±0.1 mm; a thickness of the first lens is 6.729 mm±0.1 mm; a refractive index of the first lens is 1.68879±0.01; and a curvature radius of the smooth surface of the second lens is 0 mm±0.1 mm, a curvature radius of the Fresnel surface is −58.943 mm±0.1 mm; a thickness of the second lens is 2.0 mm±0.1 mm; and a refractive index of the second lens is 1.4918±0.01.

17. A display device, comprising:

a display panel; and a VR lens structure according to claim 16 located on a light exiting side of the display panel;

wherein the Fresnel surface of the second lens is disposed closer to the display panel than the smooth surface.

18. The display device according to claim 17, wherein the distance between the center point of the display panel and the center point of the Fresnel surface of the second lens is 33.021 mm±0.1 mm.

\* \* \* \* \*